(12) United States Patent
Mullins

(10) Patent No.: US 6,264,544 B1
(45) Date of Patent: Jul. 24, 2001

(54) GAME HANGER

(76) Inventor: Eddie D. Mullins, 113 W. Reservoir Rd., Columbia, MS (US) 39429

( * ) Notice: Subject to any disclaimer, the term of this patent is extended or adjusted under 35 U.S.C. 154(b) by 0 days.

(21) Appl. No.: 09/594,164

(22) Filed: Jun. 15, 2000

Related U.S. Application Data

(60) Provisional application No. 60/139,106, filed on Jun. 15, 1999.

(51) Int. Cl.⁷ ........................................................ A22B 1/00
(52) U.S. Cl. ........................... 452/191; 452/189; 452/192; 177/245; 177/126
(58) Field of Search ................................... 452/191, 185, 452/187, 189, 188, 190, 192; 277/126, 245

(56) References Cited

U.S. PATENT DOCUMENTS

| | | | |
|---|---|---|---|
| 892,719 | * | 7/1908 | Gratton ................................. 452/191 |
| 1,183,428 | * | 5/1916 | Burns . |
| 1,338,220 | * | 4/1920 | Gillarde . |
| 2,093,732 | * | 9/1937 | Pawlitschek ........................... 452/191 |
| 4,078,625 | * | 3/1978 | Loeb . |
| 5,236,386 | * | 8/1993 | Dingee .................................. 452/192 |
| 6,032,838 | * | 3/2000 | Maher ................................... 177/264 |
| 6,043,438 | * | 3/2000 | Helberg ................................ 177/148 |

* cited by examiner

*Primary Examiner*—Willis Little
(74) *Attorney, Agent, or Firm*—Pillsbury Winthrop LLP

(57) ABSTRACT

A hanger device for suspending, dressing and weighing game comprises a main structure having an integrated weight scale for determining a total and a dressed game weight. Two main arms have a proximal end and a distal end. Each of the two main arms are provided with a lift hook at the distal end and are interconnected to the main structure at the proximal end such that the two main arms can slide along the main structure in accordance with a weight on the weight scale. Two lower arms interconnect the two main arms to a bottom portion of the main structure. A locking pin is adapted to prevent weight arranged on the hanger device from being placed on a weight spring. Arm stops are arranged at a position along two main arms such that when the two main arms are widened to a fully opened position, the two lower arms abut against the arm stops to limit an opening width of the two main arms.

20 Claims, 7 Drawing Sheets

GAME HANGER

CROSS REFERENCE TO RELATED APPLICATION

The present application claims priority to U.S. provisional application of Mullins, Ser. No. 60/139,106, filed Jun. 15, 1999, the entirety of which is hereby incorporated into the present application by reference.

BACKGROUND OF THE INVENTION

1. Field of the Invention

This invention relates generally to hanger devices and more specifically to the construction of hanger devices for suspending, dressing and weighing game.

2. Description of Related Art

Once a domestic or wild animal such as a deer, hog, antelope, elk, or other game animal is taken, hunters will dress the game in the field or place where the game was taken. A problem inherent with dressing game in the field is that dressing game on the ground offers many opportunities to damage the hide or to contaminate the meat. Hunters have thus continuously attempted to raise the game from the ground before dressing through, for example, by hanger devices.

Conventional hanger devices or game supports have been developed for suspending the game above the ground for dressing. In most cases, hanger devices of this type utilize lifting hooks which fasten to the game. In particular, the lifting hooks may be secured to separate legs of the game. The hanger devices including the lifting hooks are suspended from an overhanging support.

Conventional hanger devices require additional equipment to adapt the hanger device for suspending different sizes of game. Collapsible hanger devices solve the problem of needing different hanger devices for different size game by providing hooks which may be brought close together to facilitate attachment to the feet of the game. After engagement with the game, the hooks of this type of hanger device would be automatically expanded by the weight supported thereon so as to spread the legs of the game for convenience in dressing the same.

Weighing game has proved tremendously difficult for many hunters. Hunters must lift the game and place it onto a weight scale to measure its total weight, or the weight of the fully intact game as hunted in the wild. Then, the hunter must lower the game from the weight scale and lift the game for a second time to position it onto a hanger device where the game may be dressed. After dressing the game animal, the hunter must lower the game from the hanger device and lift the game for a third time to place it back onto the weight scale to measure its dressed weight. This continual lifting process is not only tedious, but also extremely cumbersome because big game can be very heavy.

Consequently, there exists a need to simplify the tasks of suspending, dressing and weighing game.

BRIEF SUMMARY OF THE INVENTION

In accordance with the principles of the present invention, the object of the present invention is achieved by providing a hanger device having an integrated weight scale for determining a total and a dressed game weight, wherein when an upper arm assembly of the hanger device is pulled downward under the game weight, the game weight is indicated on the integrated weight scale. A locking pin is adapted to prevent weight arranged on the hanger device from being placed on a weight spring.

Arm stops are arranged at a position along two main arms such that when the two main arms are widened to a fully opened position, two lower arms abut against the arm stops to limit an opening width of the two main arms.

Other objects, features, and advantages of the present invention will become apparent from the following detailed description, the accompanying drawings, and the appended claims.

DETAILED DESCRIPTION OF THE INVENTION

Figure 1:
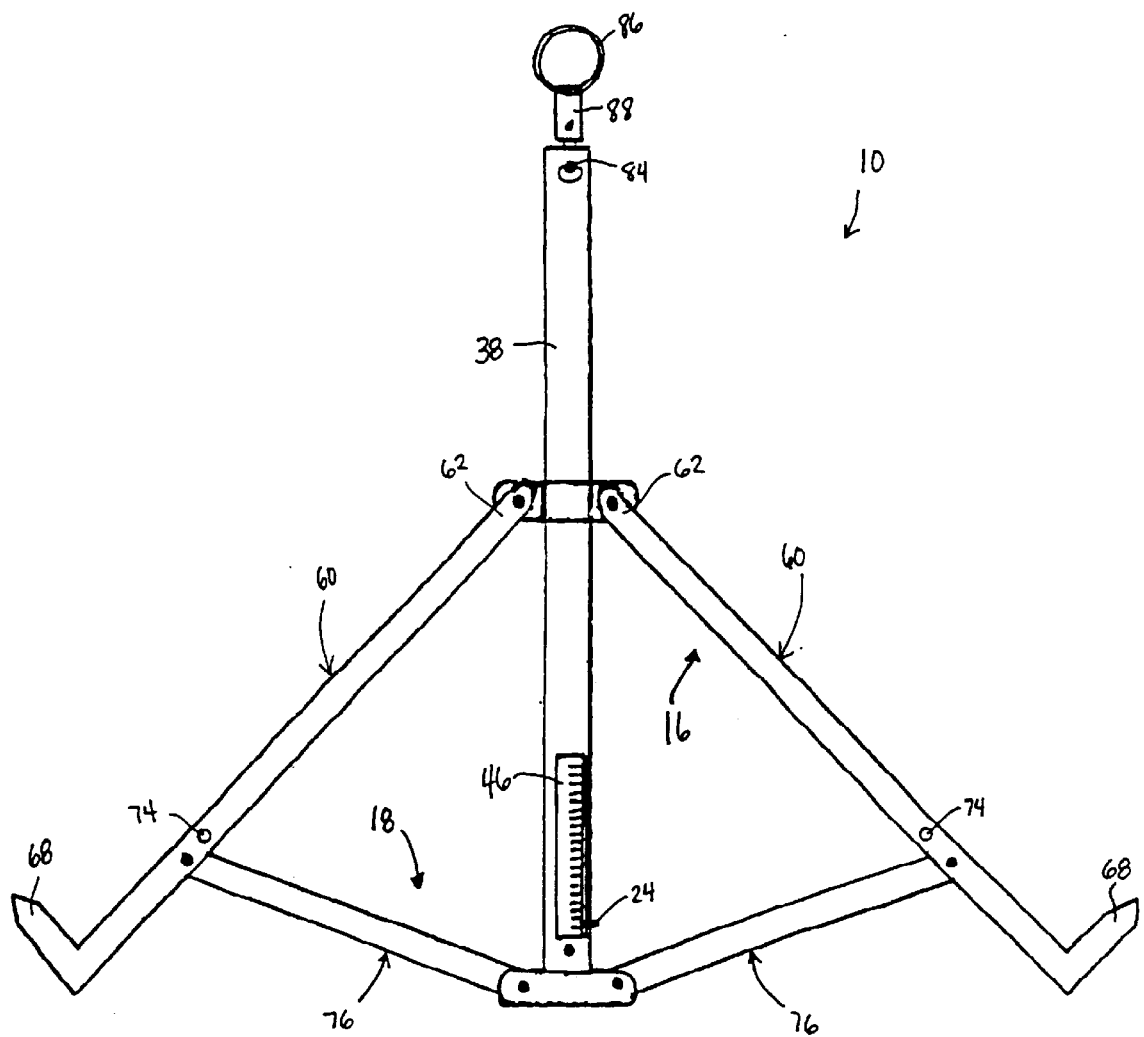
FIG. 1 is a front view of a first embodiment of a hanger device embodying the principles of the present invention shown in an open position with certain portions removed to better view others.
Figure 2:
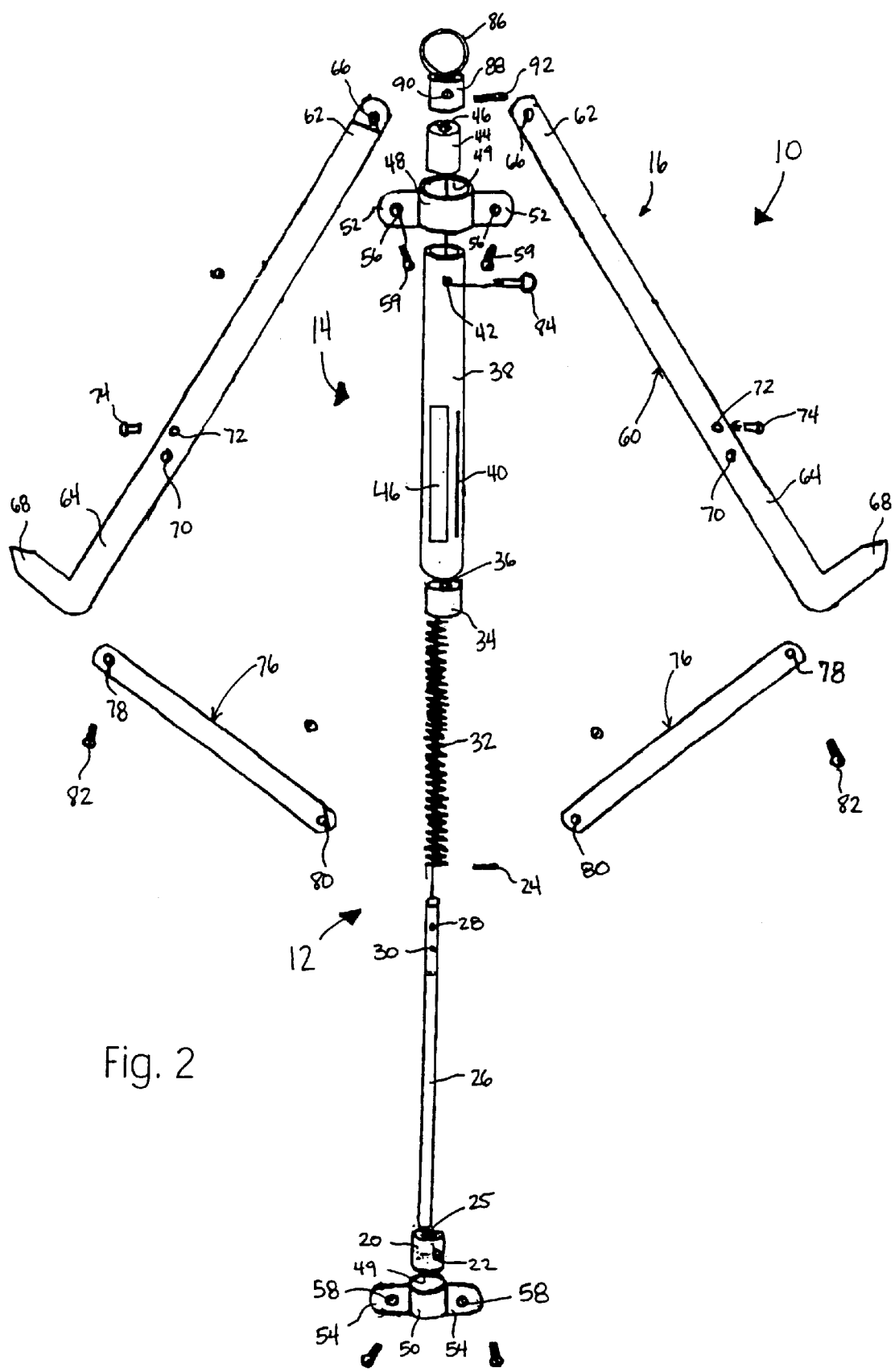
FIG. 2 is an exploded view of the hanger device of FIG. 1.

In the description below, reference numerals for the same elements remain the same in each FIG.

Referring now more particularly to the drawings, FIGS. 1–4 illustrate a first embodiment of a hanger device for suspending and weighing game, generally indicated at 10, embodying the principles of the present invention. While the game is being suspended, the game may be dressed by the user. The hanger device 10 is preferably formed from metal such as steel, selected for its economical and strength characteristics. However, one skilled in the art will readily recognize that other suitable materials may also be used.

The hanger device 10 comprises a weight scale, generally indicated at 12, integrated within a main structure, generally indicated at 14, for determining a total and a dressed game weight thereon on the hanger device. An upper arm assembly, generally indicated at 16 can be used to attach a game. For example, the legs of a game may be attached to the upper arm assembly. The upper arm assembly 16 is constructed and arranged to cooperate with the weight scale 12 such that the game weight is indicated on the integrated weight scale 12 when a game is attached to the upper arm assembly 16. A lower arm assembly, generally indicated at 18, is connected to the upper arm assembly 16 at one end thereof and to the main structure 14 at another end thereof for securing the upper arm assembly 16 into an open position in which the upper arm assembly 16 is extended away from the main structure 14. The lower arm assembly 18 is adapted to be a load bearing arm when the game is attached to hanger device 10.

The weight scale 12 includes a spring stop 20 having an opening 22 therein to accommodate a weight indicator marker 24 and a centrally positioned bore 25 extending therethrough. The spring stop 20 is fixedly secured to one end of an elongated supporting rod 26 by, for example, welding or other securing means. Disposed in the opposite end of the elongated supporting rod 26 are two aligned longitudinally spaced apertures 28, 30, respectively.

The elongated supporting rod 26 is adapted to extend through the center of a weight spring 32, which is adapted to compress under the weight of the game when the game is attached to the upper arm assembly 16 such that a game weight can be determined. The weight spring 32 is disposed on the rod 26 in an abutting relationship to the spring stop 20. Extending through a spacer insert 34 is a central bore 36 to accommodate the rod 26. The spacer insert 34 is disposed in an abutting relationship to the weight spring 32 such that the spring 32 is interposed between the spring stop 20 and the spacer insert 34. The aligned apertures 28, 30 in the supporting rod 26 extend through the center of the weight spring 32 and the bore 36 of the spacer insert 34.

The central structure 14 includes an elongated tube 38 made of steel formed with a lengthwise slit 40 defining the viewing portion of the weight scale 12, and a locking pin receiving opening 42 in the exterior thereof. The tube 38 encapsulates a portion of the weight scale 12 to protect the weight scale 12 from damage such as rusting. The weight indicator marker 24 in the form of a metal pin extends through the lengthwise slit 40 in the exterior of the tube 38 and into the opening 22 in the spring stop 20.

A spacer stop 44 having a bore 46 extending therethrough to accommodate the rod 26 is fixedly secured to one end of the tube 38 by, for example, welding or other securing means. The rod 26 extends through the spacer stop 44 such that the aperture 28 therein extends outwardly from the interior of the tube 38 and the aperture 30 therein is aligned with the locking pin receiving opening 42 in the tube 38.

A weight indicator 46 formed preferably by a weight sticker is positioned adjacent the slit 40 in the tube 38 and calibrated to the weight spring 32 of the weight scale 12 so as to provide accurate weight measurements. Preferably, the weight indicator 46 reflects a weight range of 0 to 250 pounds; however, any suitable weight range could be used so long as the weight indicator 46 is calibrated to the weight spring 32.

A pair of collar member members 48, 50 generally surround the exterior of the tube 38. So that the tube 38 extends through the center opening 49 in both collar members 48, 50. The collar member 48 is longitudinally slidable about the tube 38 between the slit 40 and the locking pin receiving opening 42 therein while the collar member 50 is secured to the bottom of the tube as for example by welding or other securing means. Each collar member 48, 50 has a pair of diametrically opposing flanges 52, 54, respectively, integrally extending therefrom. The flanges 52, 54 have fastener receiving openings 56, 58 respectively extending transversely therethrough for receiving fasteners 59.

The upper arm assembly 16 comprises two main or upper arms 60, each of which have a proximal end 62 thereof and a distal end 64 thereof. The main arms 16 can be formed from a flat metal bar, or any other suitable material for providing structural rigidity to the hanger device 10 capable of withstanding the forces exerted thereon when in the open, weighing position thereof.

Extending through the proximal end 62 of each main arm 60 is a fastener receiving opening 66, which aligns with the opening 56 in each of the flanges 52 for receiving fasteners 59. The fasteners 59 pivotally connect the main arms 60 to the collar member 48 such that the collar 48 can slide around the tube 38 in accordance with a weight on the weight scale 32 and such that the arm members 60 can be drawn inwardly toward the tube 38 from the open position into a closed position wherein the main arms 60 are folded alongside the tube 38 of the main structure 14.

A lift hook 68 is provided at the distal end 64 of each main arm 60 for engaging the game. A pair of holes 70, 72 extend transversely through each main arm 60 between the proximal end 62 and the distal end 64 thereof.

In accordance with the first embodiment, an arm stop 74 is disposed between the proximal end 62 of each main arm 60 and the associated opening 70 therein. The arm stops 74 extend through the hole 72 to the rear portion of each main arm 60 to limit the opening width of the two main arms 60 when the main arms 60 are widened to a fully opened position by butting against the lower arms 76. The abutment of the arm stops 74 against the lower arms 76 and prevents the main arms 60 from opening any wider than the fully opened position.

Preferably, the arm stops 74 are welded into position within the holes 72, but it is within the contemplation of this invention that the arm stops 74 could be integral with the main arms 60 or secured in any other suitable manner. One skilled in the art will readily recognize that other configurations and arrangements of the arm stops are possible so long as the effect of limiting the opening width of the main arms 60 is achieved.

The lower arm assembly 18 comprises two lower arms 76 in the form of metal bars, each of which have holes 78, 80 in opposite ends thereof. The hole 78 in each lower arm 76 aligns with the hole 70 in each main arm 60 for receiving fasteners 82 therethrough to pivotally connect one end of the lower arms 76 to the distal end 64 of the main arms 60. Similarly, the holes 80 align with the holes 58 in the flanges 54 for receiving fasteners 59 therethrough to pivotally connect the other end of each lower arm 76 to each flange 54 exteriorly disposed on the tube 38.

Preferably, the fasteners 59, 82 have a bolt and a nut configuration to secure the main arms 60, the lower arms 76 and the respective flanges 52, 54 in pivotal connecting relation with respect to one another as described above. It is within the contemplation of the invention that any type of fastener may be used for pivotal connecting the main arms 60, the lower arms 76 and the respective flanges 52, 54. One skilled in the art will readily recognize that the main arms 60 and lower arms 76 may be positioned on either the front or back side of the respective flanges 52, 54.

A locking pin 84 extends through the locking pin receiving opening 42 in the tube 38 and the aperture 30 in the supporting rod 26 to secure the tube 38 to the rod 26 and to prevent weight arranged on the lift hooks 68 from being placed on the weight spring 32.

A hanging element 86 is fixedly secured, preferably by welding, to a securing insert 88 having a hole 90 therein. The hole 90 aligns with the aperture 28 in the rod 26 to receive a pin 92 therethrough for securing the hanging element 86 to the rod 26 such that the hanging element 86 can suspend the hanger device 10 on a peg or other suitable hanger. Preferably, the hanging element 86 is a chain link or a steel ring.

FIG. 1 shows a front view of the hanger device 10 in an open position thereof, wherein the lifting hooks 68 integral with the distal ends 64 of the main arms 60 are pivotally extended away from the elongated tube 38 of the main structure 14. The collar member 48 is disposed above the weight spring 32 and the weight sticker 46. The weight indicator marker 24 is disposed within the slot 40 adjacent the weight sticker 46. The lower arms 76 are pivoted at one end thereof with respect to the main arms 60.

Figure 3:
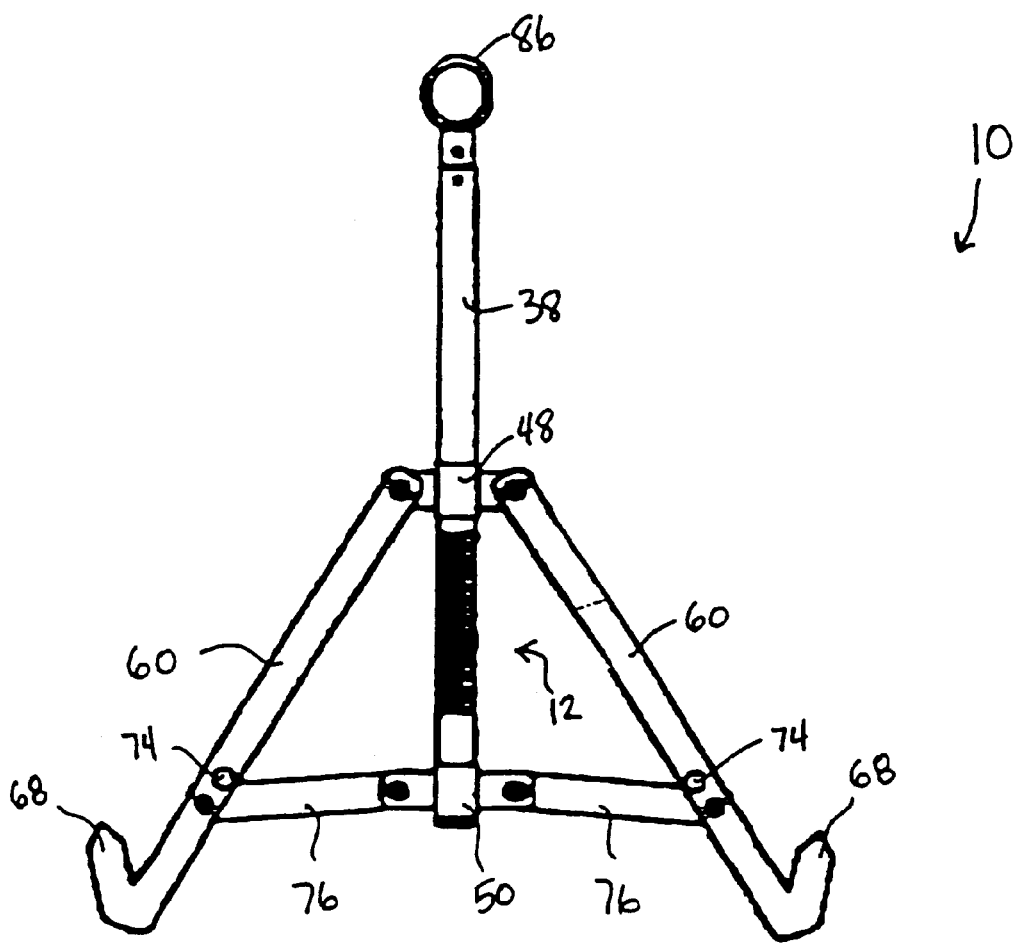
FIG. 3 is a front view of the hanger device of FIG. 1 in a fully open position.
Figure 4:
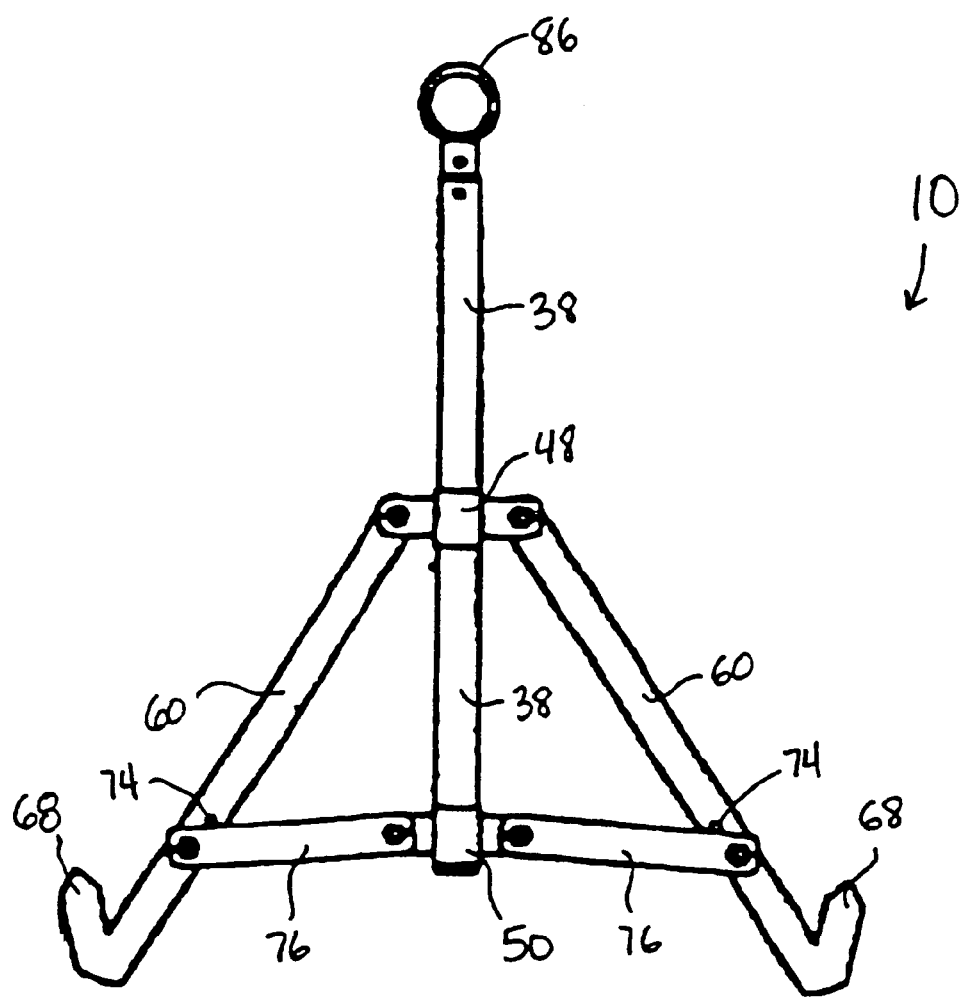
FIG. 4 is a back view of the hanger device of FIG. 1 shown in a fully open position.

FIGS. 3 and 4 show the hanger device 10 in the fully open position thereof, wherein the lifting hooks 68 integral with the distal ends 64 of the main arms 60 are extended to an outermost position thereof, which defines the width of the hanger device 10 in the fully opened position thereof. Preferably, the width of hanger device 10 in the fully open position is between about 20⅝ to 21½ inches.

The lower arms 76 abut the arm stops 74 so as to prevent the two main arms 60 from opening any wider than the fully opened position.

Figure 5:
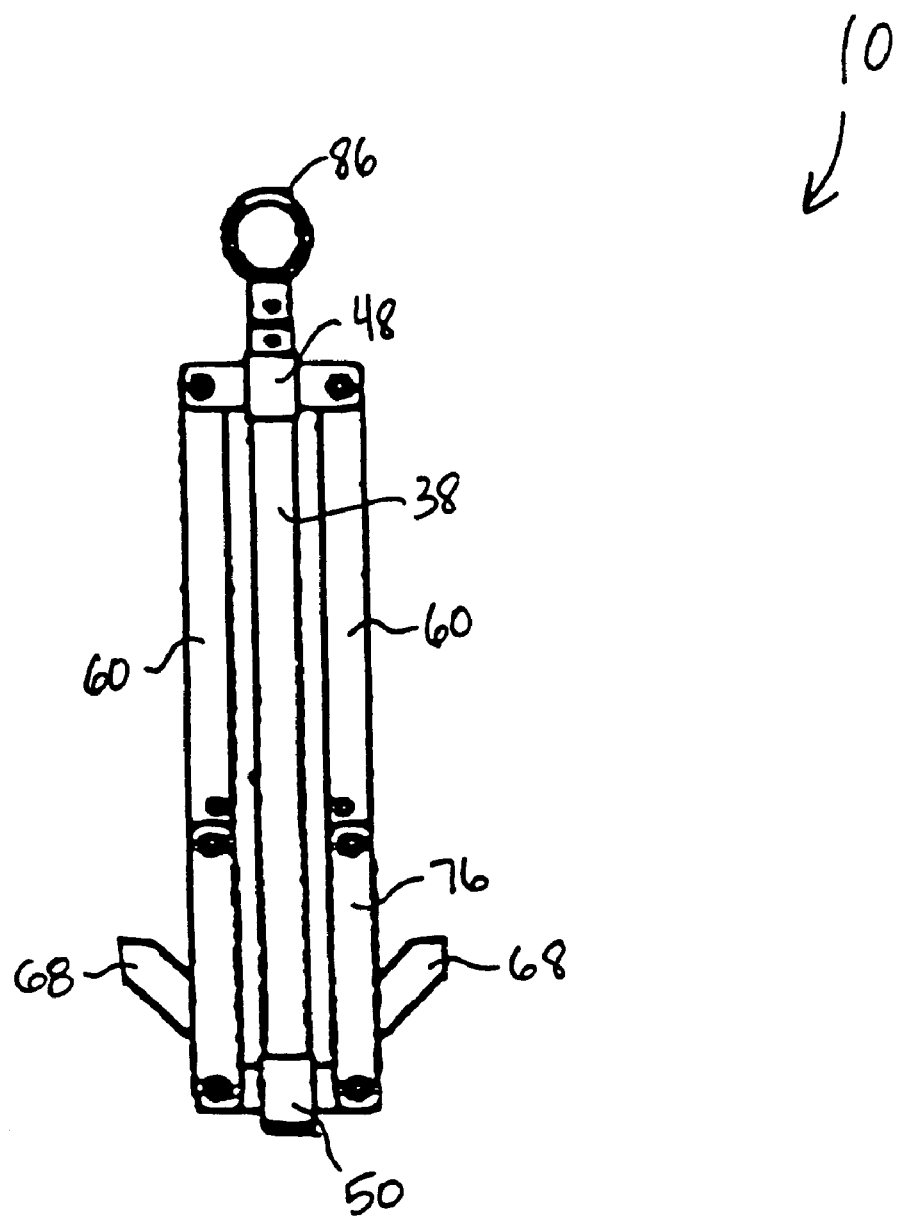
FIG. 5 is a back view of the hanger device of FIG. 1 shown in a fully closed position.

FIG. 5 shows the hanger device 10 in the fully closed position thereof, wherein the lifting hooks 68 integral with the distal ends 64 of the main arms 60 are folded to an innermost position thereof defining the width of the hanger device 10 in the fully closed position thereof. The main arms 60 and the lower arms 76 are disposed alongside the tube 38 in parallel relation with respect to one another. The collar member 48 is disposed adjacent to the locking pin receiving opening 42 in the tube 38.

Preferably, the width of the hanger device 10 when in the fully closed position thereof is approximately between 7⁷⁄₁₆ to 7½ inches. It is contemplated that the width of the hanger device 10 may be any width capable of engaging game, however, it is to be understood that narrower widths simplify engaging the game with the lift hooks 68 for the hunter.

Figure 6:
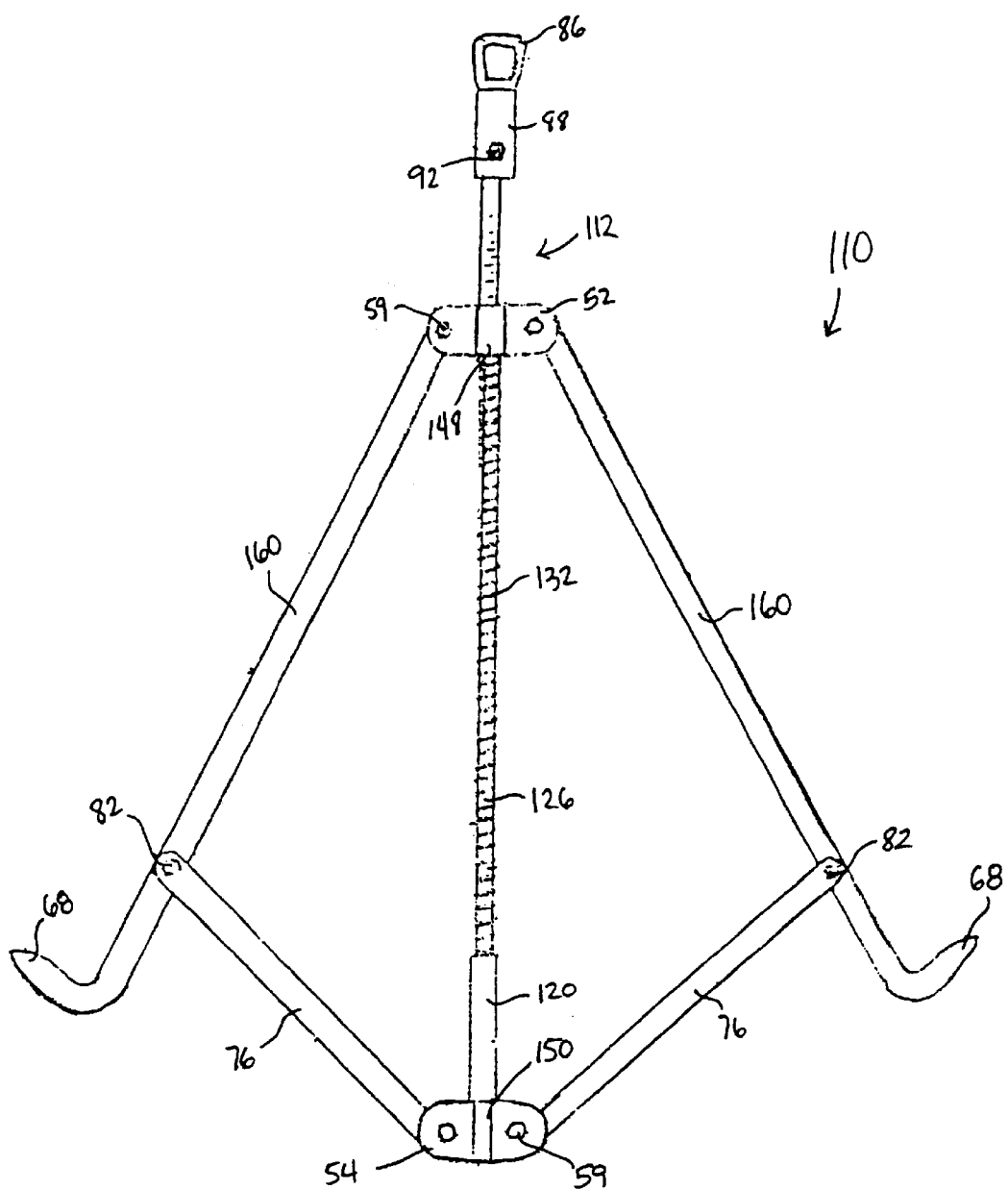
FIG. 6 is a front view of a second embodiment of the hanger device of FIG. 1 shown in an open position.
Figure 7:
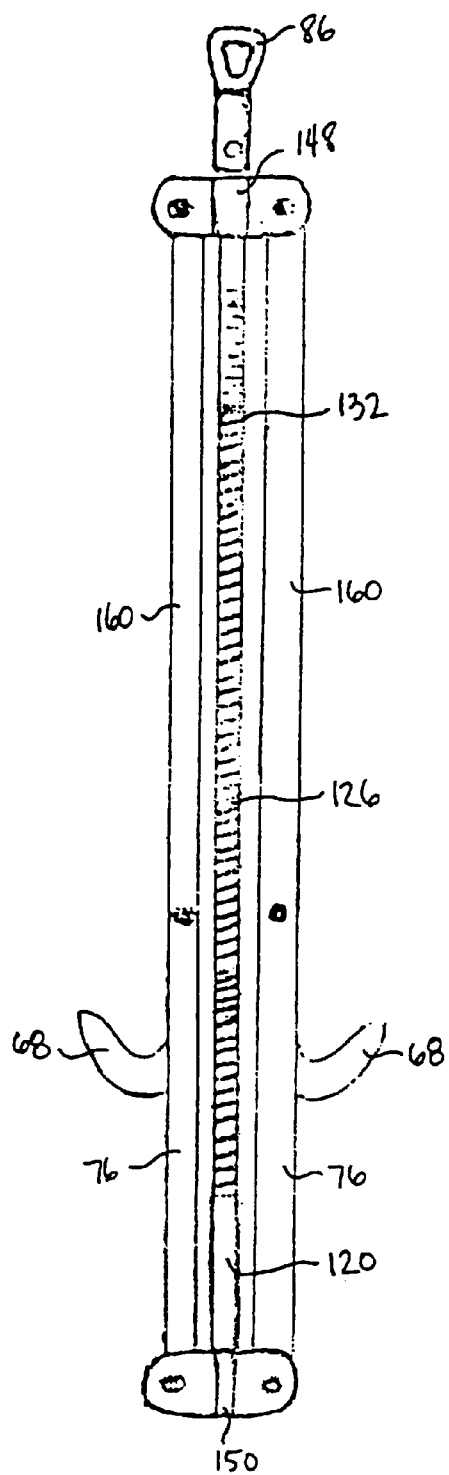
FIG. 7 is a front view of a second embodiment of the hanger device of FIG. 1 shown in a closed position.

FIGS. 6 and 7 illustrate a second embodiment of the present invention. More specifically, FIG. 6 shows a hanger device 110 comprising an integrated weight scale 112. A spring stop 120 is fixedly secured to one end of an elongated rod 126, as for example by welding. The elongated supporting rod 126 is formed with an aperture 128 in one end thereof for securing a hanging element 86 thereon.

A weight spring 132 is disposed on the rod 126 in abutting relation to the spring stop 120. The rod 126 extends through the center of the weight spring 132, which is adapted to compress under the weight of the game such that a game weight can be determined.

A pair of collar members 148, 150 respectively, have an opening 149 configured to accommodate the rod 126 therethrough. The aperture 128 in the supporting rod 126 extends through the center of the weight spring 132 and the collar member 148 such that the collar member 148 is disposed in abutting relation to one end of the weight spring 132. The spring 132 is interposed between the spring stop 120 and the collar member 148.

A viewing portion of the weight scale 112 is positioned on the supporting rod 126 above the collar member 148 and calibrated to the weight spring 132 so as to provide accurate weight measurements.

It should be noted that arm members 160 operate similarly to the arm members 60 in hanger device 10.

OPERATION

Operation of the present invention will now be described.

As shown in FIGS. 5 and 7, hanger devices 10, 110, respectively, are shown in the closed position thereof.

The hanger element 86, 186 is positioned on a hook or the like such that the hook may extend therethrough to suspend the hanger device 10, 110 thereon. Once suspended from the hook, the game hanger 10, 110 is ready for use.

Once taken, the game is positioned onto the game hanger in the following manner. The lifting hooks 68 engage the game for suspension thereof with respect to the ground or floor, preferably each lifting hook 68 engages one leg or gambrel of the game.

If a total weight measurement is wanted, the user disengages the locking pin 84 from the aperture 30 and the locking pin receiving opening 42 so that the tube 38 is free to move independently of the rod 26.

With game positioned on the lifting hooks 68 and the locking pin 84 disengaged from the aperture 30 and opening 42, the main and lower arms 60, 76 pivot outwardly with respect to the flanges 48, 50, respectively, into the open position. In turn, the collar 48, 148 begins to slide toward the spring stop 20, 120, respectively, and the lifting hooks 68 are spread away from one another. Consequently, the legs of the game are spread to a position for dressing the game, if so desired.

Once the lifting hooks 68 are spread away from one another, the total weight of the game is indicated by the weight scale 12, 112 and shown by the weight indicator 46, or weight scale 112, which can be read by the user in taking weight measurements.

The weight scale 32 of hanger device 10 operates in a slightly different manner than the weight scale 112 of the hanger device 110. In the hanger device 10, the tube 38 moves away from the hanging element 86 in accordance with the game weight on the weight scale 12, which causes the spacer stop 44 to abut the spacer insert 34. As the tube 38 moves, the spacer insert 34 compresses the weight spring 32 and the weight indicator 46 is moved into a position wherein the weight indicator marker 24 indicates an accurate weight measurement thereon.

In game hanger 110, the weight scale 112 operates in a slightly different manner. In accordance with the game weight on the weight scale 112, the collar 48 abuts the weight spring 132 and slides about the rod 126 toward the spring stop 120. As the collar 148 slides toward the spring stop 120, the spring 32 compresses. The total weight is shown on the weight scale 112, which is disposed on the rod 126 above the collar 148, and can be read by the user.

After obtaining a total weight, the user may want to dress the game. The lifting hooks 68 remain spread and offer the user a good position in which the game can be dressed.

Finally, a dressing weight may be obtained by reading the weight indicator 46, or weight scale 112 as described above.

If the game is to be stored in suspended relation for extended periods of time, it may be preferable to engage the locking pin 84 with the aperture 30 and the locking pin receiving opening 42. This engagement fixes the tube 38 to the rod 26 and helps to prevent damage to the weight scale 12.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

I claim:

1. A hanger device for suspending, and weighing game, comprising:
   a main structure having an integrated weight scale;
   an upper arm assembly coupled to the main structure, the upper arm assembly operatively arranged with the integrated weight scale such that when the upper arm assembly is pulled downward under the game weight when the game is engaged to the upper arm assembly, the game weight is indicated on the integrated weight scale, and
   a lower arm assembly connected to the upper arm assembly and to the main structure, the lower arm assembly being constructed and arranged to secure the upper arm assembly into an open position in which the upper arm assembly is extend away from the main structure.

2. The hanger device according to claim 1, wherein the upper arm assembly comprises two main arms having a proximal end and a distal end, each main arm provides a lift hook at the distal end thereof for engaging the game.

3. The hanger device according to claim 2, wherein the two main arms are pivotally connected to the main structure such that the two main arms can be drawn inwardly toward the main structure from the open position into a closed position wherein the two main arms are folded alongside the main structure.

4. The hanger device according to claim 3, wherein the lower arm assembly comprises two lower arms, each of which are pivotally connected at one end thereof to a respective one of the two main arms and at another end thereof to the main structure, and wherein the two lower arms are constructed and arranged to fold alongside the main structure when the hanger device is moved into the closed position thereof.

5. The hanger device according to claim 1, further comprising a hanging element connected to the main structure for suspending the hanger device.

6. The hanger device according to claim 4, wherein when the two main arms and the lower arms are folded alongside the main structure in the closed position, a maximum width of the hanger device is within the range of about 7 7/16 to 7 1/2 inches.

7. The hanger device according to claim 1, wherein the width of the hanger device in the open position is between about 20 5/8 to 21 1/2 inches.

8. The hanger device according to claim 1, wherein the main structure further comprises a rod, and a weight spring disposed on the rod and forming a part of the integrated weight scale, wherein the weight spring is adapted to compress under the game weight when the game is attached to the upper arm assembly such that the game weight can be determined.

9. The hanger device according to claim 8, wherein the main structure further comprises a tube enclosing a portion of the weight scale.

10. The hanger device according to claim 2, wherein the integrated weight scale is arranged such that a viewing portion of the weight scale is positioned above the proximal end of the two main arms when the hanger device is in the open position thereof.

11. The hanger device according to claim 2, wherein the weight scale is arranged such that a viewing portion of the weight scale is positioned below the proximal end of the two main arms.

12. The hanger device according to claim 9, wherein the hanger device further comprises a weight indicator marker mounted to a portion of the main structure and provided to extend through a lengthwise slit formed in a side of the tube.

13. The hanger device according to claim 10, wherein the hanger device further comprises a weight sticker positioned alongside the slit formed in the tube and calibrated to the weight spring.

14. The hanger device according to claim 13, wherein the weight sticker reflects a weight range of 0 to 250 pounds.

15. The hanger device according to claim 5, wherein the banging element is a chain link or a steel ring.

16. The hanger device according to claim 2, wherein the two main arms are formed from a flat metal bar.

17. The hanger device according to claim 2, further comprising arm stops which limit an opening width of the two main arms, the arm stops being arranged at a position along the two main arms such that when the two main arms are widened to a fully opened position, the two lower arms abut against the arm stops and prevent the two main arms from opening any wider.

18. A hanger device according to claim 10, further comprising a locking pin provided to secure the tube to the rod and adapted to prevent weight arranged on the hanger device from being placed on the weight spring.

19. A hanger device for suspending and weighing game, comprising:
   a main structure having an integrated weight scale;
   an upper arm assembly coupled to the main structure and operatively coupled with the integrated weight scale such that when the upper arm assembly is pulled downward under the game weight when the game is engaged to the upper arm assembly, the game weight is indicated on the integrated weight scale,
   the upper arm assembly comprising two main arms each having a proximal end thereof and a distal end thereof, each main arm having a lift hook at the distal end thereof for engaging the game, the two main arms being pivotally coupled to the main structure such that the two main arms can be drawn inwardly toward the main structure from the open position into a closed position wherein the two main arms are folded alongside the main structure, and
   a lower arm assembly connected to the upper arm assembly and to the main structure, the lower arm assembly being constructed and arranged to secure the upper arm assembly into the open position, wherein the upper arm assembly extends away from the main structure, the lower arm assembly comprising two lower arms, each of which are pivotally connected at one end thereof to a respective one of the two main arms and at another end thereof to the main structure, and wherein the two lower arms are constructed and arranged to fold alongside the main structure when the hanger device is moved into the closed position thereof.

20. A hanger device for suspending and weighing game, comprising:
   a main structure having an integrated weight scale;
   an upper arm assembly coupled to the main structure and operatively coupled with the integrated weight scale such that when the upper arm assembly is pulled downward under the game weight when the game is engaged to the upper arm assembly, the game weight is indicated on the integrated weight scale,
   the upper arm assembly comprising two main arms having a proximal end thereof and a distal end thereof, each main arm having a lift hook at the distal end for engaging the game, the two main arms being pivotally coupled to the main structure such that the two main arms can be drawn inwardly toward the main structure from an open position into a closed position wherein the two main arms are folded alongside the main structure, a lower arm assembly connected to the upper arm assembly and to the main structure, the lower arm assembly being constructed and arranged to secure the upper arm assembly into the open position, wherein the upper arm assembly is extended away from the main structure, the lower arm assembly comprising two lower arms, each of which are pivotally connected at one end thereof to a respective one of the two main arms and at another end thereof to the main structure, and wherein the two lower arms are constructed and arranged to fold alongside the main structure when the hanger device is moved into the closed position thereof, and arm stops which limit an opening width of the two main arms, the arm stops being arranged at a position along the two main arms such that when the two main arms are widened to a fully opened position, the two lower arms abut against the arm stops and prevent the two main arms from opening any wider.

* * * * *